(12) United States Patent
Fredericks

(10) Patent No.: US 11,825,156 B1
(45) Date of Patent: Nov. 21, 2023

(54) COMPUTER SYSTEM FOR PROCESSING MULTIPLEXED DIGITAL MULTIMEDIA FILES

(71) Applicant: Axon Enterprise, Inc., Scottsdale, AZ (US)

(72) Inventor: Andrew Thomas Fredericks, Spokane, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/183,388

(22) Filed: Feb. 24, 2021

Related U.S. Application Data

(60) Provisional application No. 63/083,008, filed on Sep. 24, 2020, provisional application No. 62/981,125, filed on Feb. 25, 2020.

(51) Int. Cl.
| | |
|---|---|
| *H04N 21/434* | (2011.01) |
| *H04N 21/44* | (2011.01) |
| *H04N 21/43* | (2011.01) |
| *H04N 21/4402* | (2011.01) |

(52) U.S. Cl.
CPC ..... *H04N 21/44008* (2013.01); *H04N 21/434* (2013.01); *H04N 21/43072* (2020.08); *H04N 21/440218* (2013.01)

(58) Field of Classification Search
CPC ....... H04N 21/44008; H04N 21/43072; H04N 21/434; H04N 21/440218; H04N 21/8193
See application file for complete search history.

(56) References Cited

U.S. PATENT DOCUMENTS

| | | | |
|---|---|---|---|
| 8,526,458 B1* | 9/2013 | Jensen | H04L 27/2631 370/432 |
| 9,172,982 B1* | 10/2015 | Kizhepat | H04N 21/4347 |
| 2008/0106640 A1* | 5/2008 | Fleischman | H04N 21/440218 348/441 |
| 2017/0111649 A1* | 4/2017 | Wang | H04N 19/188 |
| 2017/0324934 A1* | 11/2017 | Barkley | H04N 7/152 |
| 2020/0221159 A1* | 7/2020 | Stockhammer | H04N 21/23439 |

* cited by examiner

*Primary Examiner* — Jefferey F Harold
*Assistant Examiner* — Alexander Boyd

(57) ABSTRACT

To perform evidentiary analysis on media files generated by a video surveillance system, a media file is analyzed to determine the format of the media file. Information about that format is used to decode media files from that video surveillance system into separate streams of media data. A computer system assists a person in defining logical parameters that can be used to parse and decode a media file of a particular type and outputs corresponding format data. The format data includes data that instructs a decoder how to decode media files of that type. A second computer system that provides analysis tools includes the decoder, which receives one or more media files of a particular type and corresponding format data for that type. The second computer system can access and process each of the separate streams individually for playback or other image or media processing.

19 Claims, 8 Drawing Sheets

Format File - 400

Data indicating start of an image - 402
Example: rule specifying reserved code and offset from location where reserved code is found Location of data indicating image length - 404
Example: offset from image start Location of data indicating stream (or camera) to which each image belongs - 406
Example: offset from image start Location of data indicating a time stamp for an image - 408
Example: offset from image start Location of data indicating type of image (e.g., I, P, B, Audio) - 410
Example: offset from image start Where to begin searching for the next image - 412
Example: Rule based on start of current image and other data.

| If/Then | Frame Indicator | Next Frame Search Start |
|---|---|---|
| LOC([FrameIndicator]+69), LEN(4)==000000161 | E4 F6 4E 03 | LOC([EndOfVideo]) |
| LOC([FrameIndicator]+69), LEN(3)==017A00 | E4 F6 4E 03 | LOC([EndOfVideo]) |
| LOC([FrameIndicator]+69), LEN(4)==000000167 | E4 F6 4E 03 | LOC([EndOfVideo]) |

...

| Frame Length | ... | Frame Type | Video Start |
|---|---|---|---|
| LOC([FrameIndicator]+20), LEN(2), DEC(intR2L) | | P | [Frame Indicator]+68 |
| LOC([FrameIndicator]+20), LEN(2), DEC(intR2L) | | A | [Frame Indicator]+68 |
| LOC([FrameIndicator]+20), LEN(2), DEC(intR2L) | | I | [Frame Indicator]+68 |

...

652

| Index | Byte Position | Stream Index | Frame Type | Time stamp | Frame Length | Start Video | End Video |
|---|---|---|---|---|---|---|---|
| 1 | 4096 | 7 | I | 9/6/12 5:10:00 PM | 31991 | 4164 | 36155 |
| 2 | 36155 | 0 | A | 9/6/12 5:10:00 PM | 248 | 36233 | 36471 |
| 3 | 36471 | 1 | A | 9/6/12 5:10:00 PM | 248 | 36539 | 36787 |
| 4 | 36787 | 2 | A | 9/6/12 5:10:00 PM | 248 | 36855 | 37103 |
| 5 | 37103 | 3 | A | 9/6/12 5:10:00 PM | 248 | 37171 | 37419 |
| 6 | 37419 | 12 | I | 9/6/12 5:10:00 PM | 55415 | 37487 | 92902 |
| 7 | 92902 | 10 | P | 9/6/12 5:10:00 PM | 1320 | 92970 | 94290 |
| 8 | 94290 | 9 | I | 9/6/12 5:10:00 PM | 26015 | 94358 | 120373 |
| 9 | 120373 | 11 | P | 9/6/12 5:10:00 PM | 5592 | 120441 | 126033 |
| 10 | 126033 | 8 | P | 9/6/12 5:10:00 PM | 5741 | 126101 | 131842 |
| 11 | 131842 | 6 | I | 9/6/12 5:10:00 PM | 20071 | 131910 | 151981 |
| 12 | 151981 | 5 | P | 9/6/12 5:10:00 PM | 6850 | 152049 | 158899 |
| 13 | 158899 | 0 | A | 9/6/12 5:10:00 PM | 248 | 158967 | 159215 |
| 14 | 159215 | 1 | A | 9/6/12 5:10:00 PM | 248 | 159283 | 159531 |

FIG. 6B

COMPUTER SYSTEM FOR PROCESSING MULTIPLEXED DIGITAL MULTIMEDIA FILES

CROSS-REFERENCE TO RELATED APPLICATIONS

This application claims priority to, and is a nonprovisional application of, prior filed U.S. Provisional Patent Application Ser. No. 62/981,125, filed Feb. 25, 2020, entitled "COMPUTER SYSTEM FOR PROCESSING MULTIPLEXED DIGITAL MULTIMEDIA FILES", which is hereby incorporated by reference.

This application also claims priority to, and is a nonprovisional application of, prior filed U.S. Provisional Patent Application Ser. No. 63/083,008, filed Sep. 24, 2020, entitled "COMPUTER SYSTEM FOR PROCESSING MULTIPLEXED DIGITAL MULTIMEDIA FILES", which is hereby incorporated by reference.

BACKGROUND

Motion video is a common source of evidence of incidents such as traffic accidents and criminal activity. A variety of information can be gleaned from motion video through image processing, such as position, speed, acceleration, and relative position of objects. Each image in motion video provides two spatial dimensions of information. Motion video also provides a temporal dimension, allowing additional information to be extracted by analyzing multiple images.

Typically, a digital still image is generated by a camera, in which light is captured by a light-sensitive device, such as a charge-coupled device (CCD). The light-sensitive device outputs a two-dimensional image. The camera may include a lens to focus the light onto the light-sensitive device. This image output by the device is digitally stored as an N by M array (where N and M are positive integers) of picture elements, called pixels. Each pixel is represented by data representing one or more color components. The term "color component" is intended to include both black and white images and color images. The image can be called a frame. "Digital motion video" is a time-based series of such frames, with each frame stored as a digital still image. A digital still image can be stored in an uncompressed form or in a compressed form.

Digital motion video typically is stored in computer data files in a data storage system. The digital motion video can be generated in any of a variety of formats. There are different data formats for pixel data (i.e., bits per pixel and color components used), spatial resolutions (i.e., image size in n pixels by m pixels), and temporal resolutions (i.e., frame rate or number of frames per second). The digital motion video can have associated audio. The digital motion video typically has associated metadata, which also can be present in a variety of formats. For example, one or more images may have associated time stamps. The digital motion video can originate from motion video captured in an analog format, which is then converted to digital format. The digital motion video can be captured directly in a digital format.

Typically, in video surveillance systems, digital motion video includes at least image data from a plurality of different cameras. The image data from multiple cameras, any audio data, and any metadata, are multiplexed into a single stream of data. Typically, this single stream of data is a bitstream conforming to a standard structure expected by a decoder which can transform the bitstream back into image data for display. Typically, the data format for pixel data, spatial resolution, temporal resolution, number of streams of image data multiplexed, presence of audio, data format for metadata, and format of the stream of data in the data file output by a video surveillance system varies from one system to another, depending on both the manufacturer of the video surveillance system and the number, configuration, and manufacturer of cameras used by an end user. Individual frames of video from surveillance systems are typically encoded with a known standard codec such as H.264. However, the files are organized in proprietary structure, where these frames are mixed together, sometimes altered at the binary level, and otherwise unreadable by a person for meaningful analytical work.

SUMMARY

This Summary is provided to introduce a selection of concepts in a simplified form that are further described below in the Detailed Description. This Summary is intended neither to identify features considered key or essential nor to limit the scope of the claimed subject matter.

For various types of evidentiary analysis, a data file that includes digital motion video, or audio data, or metadata about the digital motion video or audio data, or any combination of two or more of these, hereinafter a "media file", such as generated by a video surveillance system, is first analyzed to determine the format of the media file, and then information about that format is used to decode media files from that video surveillance system into separate streams of video data.

In one implementation, a first computer system provides a graphical user interface to assist a person in defining logical parameters that can be used to parse and decode a media file of a particular type. This first computer system outputs corresponding format data. The format data may be stored in a data file called herein a format file. The format data includes data that instructs a decoder how to decode media files of that type to generate separate streams of media data corresponding to separate cameras from which digital motion video originated, or other separate sources of audio data or metadata. Generally, the format data includes data indicating to a decoder how to identify the beginning of each frame of media data, how long each frame of media data is, the stream (e.g., camera or other source) to which each frame of media data belongs, a date/time stamp for each frame of media data, where to begin searching for the next frame, and what type of frame the frame is (I, P, B, Audio, metadata, etc.). For example for video data, the format data includes data indicating to the decoder how to identify the beginning of each image, how long each image is, the stream (or camera) to which each image belongs, a date/time stamp for each image, where to begin searching for the next image, and what type of frame the image is (I, P, B, Audio, etc.).

A second computer system that provides video analysis tools includes the decoder, which receives one or more media files and corresponding format data. The second computer system can access and process each of the separate streams individually for playback or other image processing. Thus, the first computer system is used to produce format data for type of media file and the second computer system subsequently accesses that format data to process media files of that type.

Accordingly, in one aspect, a computer system implements a decoder that generates, from an input media file and format data associated with the input media file, separate streams of video data. The format data may be stored in a data file called herein a format file. The decoder includes programmable components having parameters specifying how the programmable components decode the input media file. The decoder uses the format data to set the parameters of the programmable components. The decoder processes the input media file according to the parameters set according to the format data to generate the separate streams of video data.

In one aspect, a computer system includes a file analysis module that generates format data for a media file. The file analysis module accesses the media file and presents to a user data indicative of the data format used in the media file. In response to inputs from the user, the file analysis module stores data for decoding parameters as format data in computer storage, such as in a format file, wherein the format data indicates to a decoder how to decode the data format of the input media file.

In one aspect, a first computer system includes such a file analysis module, a second computer system includes such a decoder. In one aspect, a single computer includes the file analysis module and the decoder. The file analysis module generates and stores the format data in computer storage. The decoder accesses the format data and processes the media file.

In some implementations, there are a plurality of file analysis modules. In some implementations, there are a plurality of decoders. Format data can be associated with multiple input media files of a same type. There may be a plurality of types of input media files.

Any of the foregoing aspects can include one or more of the following features. The format data indicates to a decoder how to identify the beginning of each image, how long each image is, the stream (or camera) to which each image belongs, a date/time stamp for each image, where to begin searching for the next image, and what type of frame the image is (I, P, B, Audio, etc.).

Any of the foregoing aspects can include one or more of the following features. The format data includes data specifying a pattern indicative of a start of a frame of data. The format data includes data specifying a location of an identifier of a stream to which the frame of data belongs with reference to the start of the frame of data. The format data includes data specifying a location of beginning of image data for the frame with reference to the start of the frame of data. The format data includes data specifying a location of data indicating a length of the image data for the frame with reference to the start of the frame of data. The format data includes data specifying a location of data indicating a type of the frame with reference to the start of the frame of data.

Any of the foregoing aspects can include one or more of the following features. The file analysis module includes a graphical user interface. The graphical user interface includes a display of rules defining logical parameters of the format data. The graphical user interface includes a display of a spreadsheet of hex codes from the media file.

In the following description, reference is made to the accompanying drawings which form a part hereof, and in which are shown, by way of illustration, specific example implementations. Other implementations may be made without departing from the scope of the disclosure.

BRIEF DESCRIPTION OF THE DRAWINGS

FIG. 4 is an illustrative diagram of an example format file that stores format data.

FIG. 6B is an illustrative example of a graphical user interface for the file analysis module.

DETAILED DESCRIPTION

Figure 1:
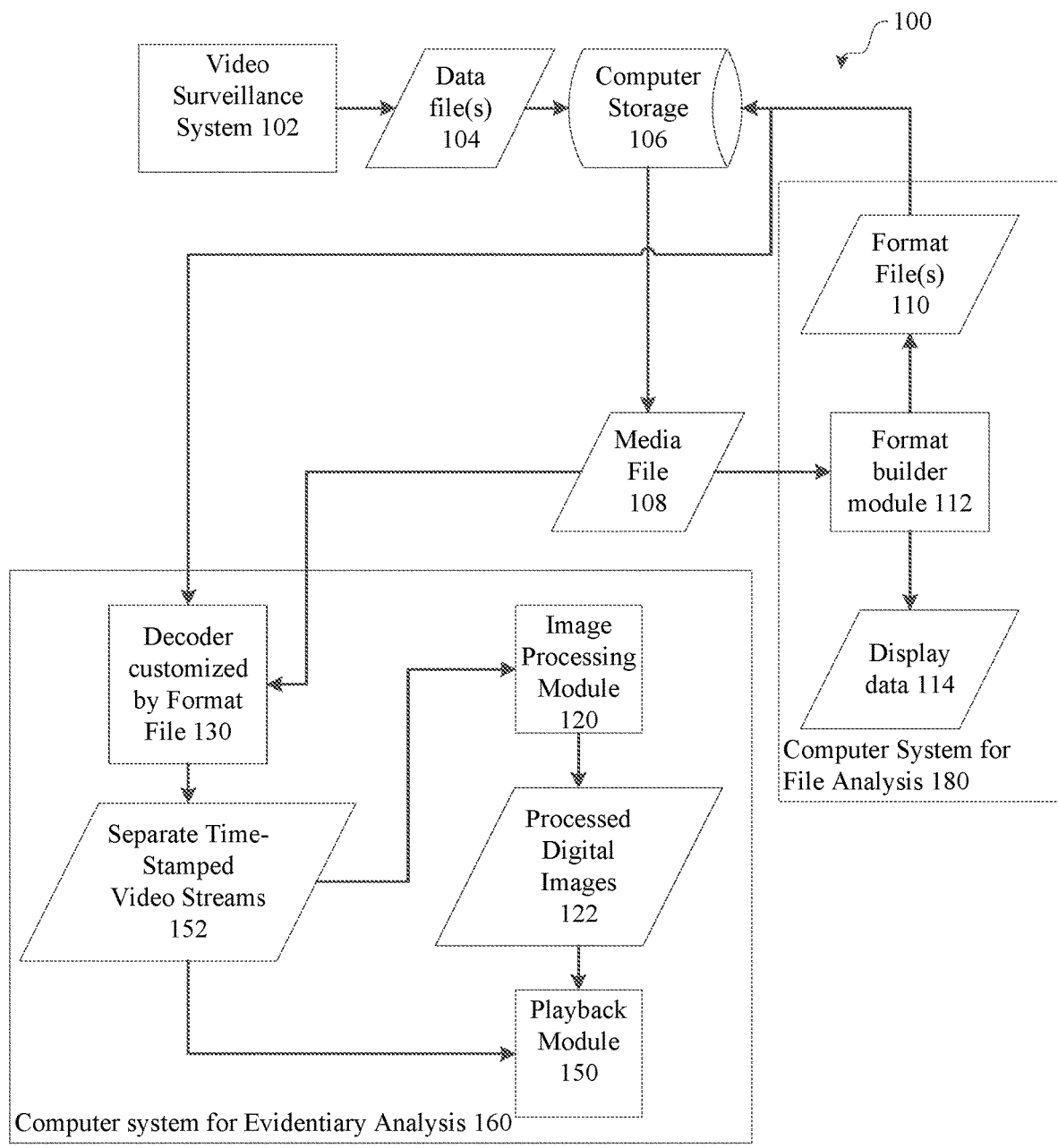
FIG. 1 is a data flow diagram of an illustrative example implementation of a computer system 100 that processes digital motion media files.

FIG. 1 is a data flow diagram of an illustrative example implementation of a computer system 100 that processes data files including digital motion video, or audio data, or related metadata, or any combination of two or more of these, i.e., "media files", such as generated by a video surveillance system. In this example implementation, the format data is stored in computer storage in a data file herein called a "format file". It should be understood that the format data can be stored in computer storage in a variety of different formats, and can be transferred among computer systems in a variety of different formats. In this example, it is presumed that the media file contains at least digital motion video, and may contain audio, or metadata, or both. In some implementations, the media file can contain only audio data, or only metadata, or a combination of only audio data and metadata, without any digital motion video data. In some implementations, the media file may contain only digital motion video.

The computer system 100 of FIG. 1 includes a video surveillance system 102, which typically includes multiple cameras and typically is used and controlled by one entity. There may be multiple video surveillance systems 102. There may be multiple entities with different and independently-operated video surveillance systems 102. One or more of such entities provide one or more data file(s) 104 including at least digital motion video from the video surveillance system 102 to another entity, such as a governmental entity or a private consulting entity, for analysis. There may be several of such other entities. The data file(s) 104 is/are stored on computer storage 106 of the computer system 100.

In some implementations, the computer storage 106 can be "cloud" storage or other storage accessible over a wide area or local area computer network to which data file(s) 104 can be uploaded from the video surveillance system or from another computer. In some implementations, a computer network over which the data file 104 can be uploaded to computer storage 106 can be publicly accessible, such as the internet. In some implementations, that computer network can be private. In some implementations, data file(s) 104 can be transmitted by a variety of means to, and a copy of the data file 104 can be stored on, the computer storage 106, including email, or delivery of computer storage on which the data file 104 is stored, or other means, or any combination of these.

In practice, the computer system 100 typically processes data files 104 from several entities that use different video surveillance systems. Thus, the data files 104 as received include video and other data in a variety of different formats.

In the following description, the processing of one media file 108, selected from among the data file(s) 104 stored on the computer storage 106, will be provided as an illustrative example. It should be understood that the computer system can process data files 104 of multiple different data formats, and that components of the computer system described below assist in determining the data formats used in any media file 108 selected from among many data files 104 stored on computer storage 106. It also should be understood that multiple different computer systems 100 can be used collectively to process data files 104. Also, in many cases, a media file 108 provided to the computer system 180 is different from, but of the same file type, as a media file provided to the computer system 160. In some cases, the media file 108 provided to the computer system 180 should not include any sensitive information which is reserved to the users of the computer system 160 to access.

In this illustrative example, a person uses a computer system 160 to process the media file 108 to analyze its contents for evidence. Typically, a person familiar with investigations and reviewing video for evidence uses computer system 160. In some implementations, there can be multiple different individuals using the computer system 160. In some implementations, multiple computer systems 160 are used.

Before the person can do their work using computer system 160 with the media file 108, a format file 110 for the media file 108 is generated, typically using another computer system 180 on which file analysis is performed. Typically, a person familiar with data formats for media files uses computer system 180. In some implementations, there can be multiple different individuals using computer system 180. In some implementations, multiple computer systems 180 are used. In some implementations, the computer system 180 and 160 may be the same computer system. In some implementations, parts of computer system 180 as shown in FIG. 1 may reside in a computer system 160; likewise, parts of computer system 160, such as a decoder, may reside in a computer system 180.

The computer system 180 includes a format builder module 112 that receives the media file 108 as an input. The format builder module 112 generates display data 114 to assist a person in identifying and defining logical parameters that will be used to decode the media file. Such logical parameters include data that instructs the decoder how to decode the media file to generate separate streams of video data, preferably with time stamps, and corresponding to the separate cameras from which the digital motion video originated. The format builder module 112 outputs a format file 110 which includes these logical parameters.

As will be explained below in connection with an illustrative example, the display data 114 generated by the format builder module 112 graphically presents structure or patterns of the media file. Using this information, the person can specify logical parameters and input these logical parameters to the format builder module 112. Using the specified logical parameters, the format builder module 112 updates the display data 114 for the graphical presentation to the person. Using this feedback loop, the person continues to define as many logical parameters as possible.

As will be explained below in connection with an illustrative example implementation of a format file 110, in FIG. 4, the logical parameters which the person can specify are any that data that instructs the decoder how to decode the media file. Such logical parameters may including information such as how to identify the beginning of each image, how long each image is, the stream (or camera) to which each image belongs, a date/time stamp for each image, where to begin searching for the next image, and what type of frame the image is (I, P, B, Audio, etc.).

In this illustrative example in FIG. 1, the first computer system 180 is used to produce the format file 110 for a media file 108, a second computer system 160 subsequently accesses that format file 110 to process the media file 108 and other media files having the same format. There are several ways through which format data can be accessed by the second computer system 160. In some implementations, the format data can be stored in in the computer storage 106, such as in a format file 110, from which the second computer system 160 can access the format data, such as by accessing the format file 110. In some implementations, the first computer system 180 can transmit format data directly to the second computer system 160. In some implementations, the format data can be delivered through another computer system, such as through an electronic mailing system, or digital document delivery system, or by other means, or some combination of these. In some implementations, the first computer system 180 can store the format data on computer storage which is turn is transferred to the second computer system 160.

The format data, such as a format file 110, is associated with the media file 108 which was used by the format builder module 112, and also may be associated with one or more other media files 108. The same format data may be associated with multiple media files 108 because the computer system may receive multiple data files 104 from the same video surveillance system 102, or from different video surveillance systems which used the same data format. The association between a format file 110 and a media file 108 can be established in many ways, such as by a similar file name, by using the same prefix or suffix or extension on a file name, or by an additional data structure directly relating a media file to a format file 110. In some implementations, the computer system 160 can automatically process a media file by determining which format data corresponds to the media file, based on the content of the media file and the rules in the format data.

The computer system 160 includes a decoder 130 which decodes the media file 108 according to the logical parameters set forth in the format file 110 corresponding to that media file. The decoder is, in effect, parameterized such that the format data is used to determine how its corresponding media file is to be decoded. An illustrative example of an implementation of such a decoder will be explained in more detail below.

The decoder 130 outputs data allowing playback of separate streams of video data (152) corresponding to the separate cameras from which the digital motion video in the media file had originated. For example, in some implementations the decoder 130 can generate the separate streams of video data and store them in separate media files on computer storage (not shown) in the computer system 160, storing one media file for each of the separate streams. Each media file can be separately playable. In some implementations, the decoder can generate the separate streams of video data and retain them in memory or other computer storage of the computer system 160 while those separate streams are being used. In some implementations, the format data can be used to access the data for a selected one of the separate streams of video data during playback of the media file 108.

In some implementations, a stream of video data output from the decoder also is time stamped. For example, each image in each of the separate streams can have its own time stamp. The decoder can access data about time stamps for images from the media file, for example, when locations for time stamp data in the media file are identified to the decoder by the format data. In some implementations, a graphical representation of the time stamp for an image can be inserted into the image as an overlay. In some implementations, the overlay can be permanently inserted on the image in a media file. In some implementations, the overlay can be dynamically added to the image during playback.

In the example implementation shown in FIG. 1, the computer system 160 is used for evidentiary analysis of video and includes a playback module 150. The playback module can have associated selection controls to select one of the streams 152 derived from the processed media file 108 and playback controls, such as to play, pause, scan forward and backward, and stop playback of the selected stream in a display area of a display.

In the example implementation shown in FIG. 1, the computer system 160 also can include an image processing module 120. The image processing module has selection controls to select one or more of the streams 152 derived from the media file 108, or one or more images within a selected stream, or both, and image processing controls allowing a user to select and perform different image processing operations on the selected stream(s), or the selected image(s), or both. Processed digital images or video 122 also may be played back through the playback module 150, or may be provided directly to a display area of the display by the image processing module 120, or may be stored, or any combination of these.

It should be understood that the invention is not limited to any particular playback functionality or image processing capability of the computer system 160.

Figure 2:
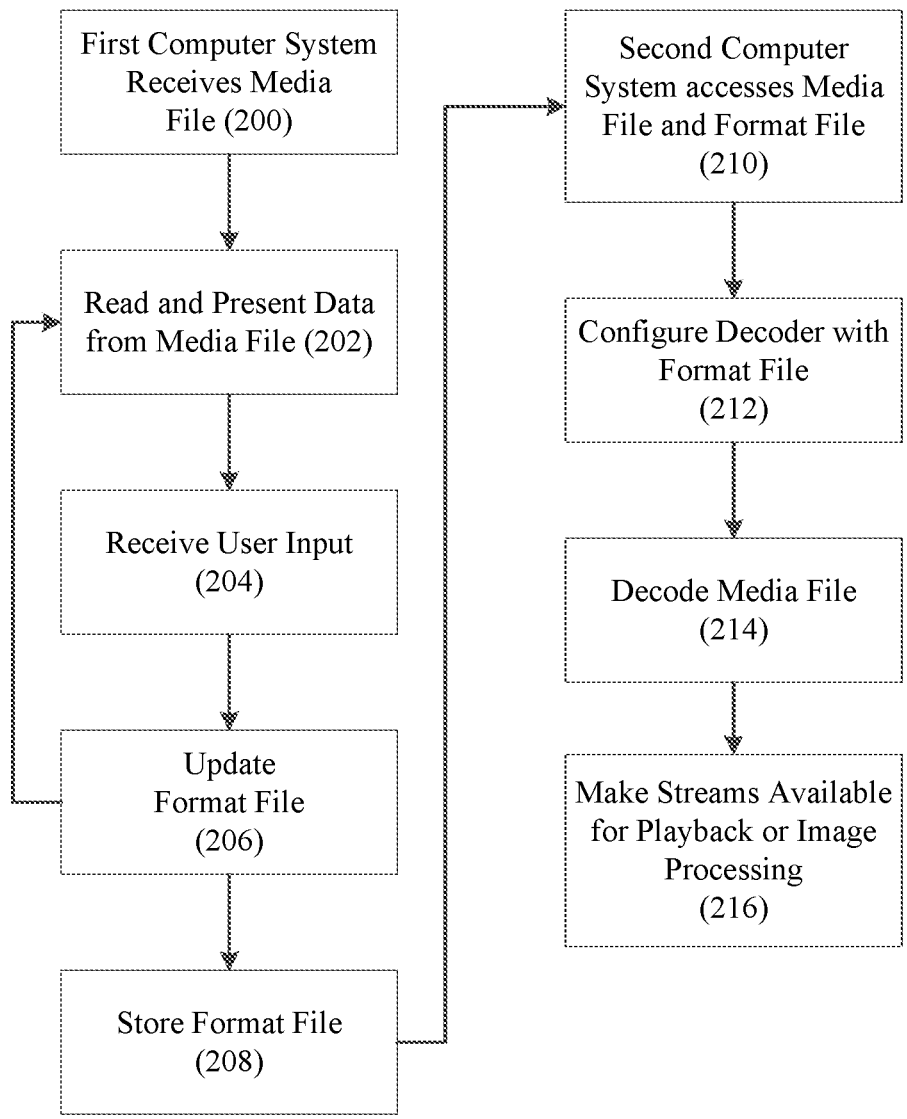
FIG. 2 is a flowchart of operation of an example implementation of a computer system such as in FIG. 1.

Turning now to FIG. 2, an example flow of operation using the computer system of FIG. 1 will now be described. A first computer system for performing file analysis, such as computer system 180 in FIG. 1, receives (200) a media file. The first computer system reads (202) data from the media file and presents corresponding display data to the person using the system. An illustrative example is explained in more detail below. The first computer system receives (204) user input from the person through an input device, specifying logical parameters defining the format of the media file. The first computer system uses these logical parameters as specified by the user to update (206) the format file 110. Using these logical parameters, the first computer system can update and re-present (202) the display data, and the first computer system can receive (204) further user input, and continue to update (206) the format file 110. When the person using the system indicates that this process is complete, the first computer system stores (208) the format file 110.

A second computer system for performing evidentiary analysis of video data, such as computer system 160 in FIG. 1, accesses (210) a media file and its corresponding format data, such as format file 110. The second computer system configures (212) its decoder according to the format data. The decoder decodes (214) the media file according to this configuration and any selection by the person using the system, such as a desired output mode, selected stream, or other selection. Decoding results in one or more separate streams of video data, which the second computer system can make available (216) for playback or image processing.

Having now described the general operation of the computer system with respect to the example implementations of FIGS. 1 and 2, some example implementations will now be described in connection with FIGS. 3 through 6A-B.

Figure 3:
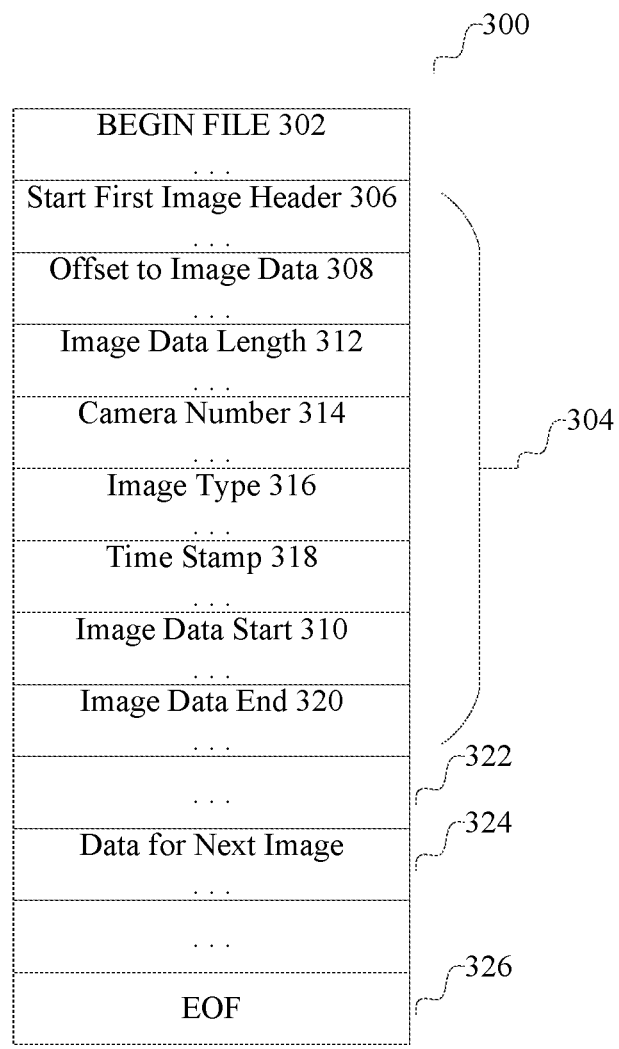
FIG. 3 is an illustrative diagram of a media file.

FIG. 3 is an illustrative example of structure of a media file. A media file generally stores digital motion video information as a sequence of images, along with metadata describing the digital motion video, and optionally other data, such as audio data or other media data. Typically, the media file includes an encoded bitstream 300. The bitstream begins with information about the encoded bitstream, which can include a variety of metadata, as indicated at 302. At some point in the bitstream, data for a first image occurs, as indicated at 304. Typically, this data for the first image starts (306) with a header for the first image. This header includes meta data about the first image. The header can include a wide variety of information, but for the purposes of decoding the header typically includes data indicating a location 308 to the start 310 of the image data, whether by its position in the bitstream or an offset to that position, an indication of the length 312 of the image data, and indication 314 of a camera or stream to which the image belongs, a type 316 or other information about the image data format, and a time stamp 318. The end 320 of the image data can be identified by the length 312, which may be an offset added to the start 310 of the image data, or may be data indicating the position in the bitstream of the end of the image. Other data can occur between any given image and the subsequent image 324, as indicated at 322, until the end 326 of the bitstream is reached.

As indicated by the "..." in FIG. 3, other information can be included between the specific items of data shown in FIG. 3. Further, such data may occur in any order. The kinds of metadata present, and ordering of the metadata, generally are or can be different between any two media files obtained from two different systems. On the other hand, the files from different systems typically are formally compliant with a known standard. Thus, the standardization provides a way to identify which data is where in any given data file; however, the standardization is under-constrained, such that two files from two different systems likely have the same information in different locations in the bitstream.

To help decode an arbitrary media file, the format data for the media file is generated. FIG. 4 is an illustrative diagram of an example format file 400 for storing such format data. As noted above, the format data includes data defining logical parameters that will be used to decode the media file. Such logical parameters include data that instructs the decoder how to decode the media file to generate separate streams of video data, preferably with time stamps, and corresponding to the separate cameras from which the digital motion video originated. For example, as shown in FIG. 4, the format data can indicate how to locate certain information within a bitstream.

In FIG. 4, a first logical parameter is data 402 indicating how to locate a start of image (such as the start 306 in FIG. 3). An example of this logical parameter is a form of rule that specifies a reserved code for which to search in the bitstream, which has a known relationship to the image data, and an offset in the bitstream from this reserved code. The start 306 of image data typically has a known relationship to, i.e., an offset in the bitstream from, such a reserved code. This code and offset can be stored at 402.

Other data about an image in a bitstream typically are at fixed offsets from the start of the image data for all images in the bitstream. Thus, the format file 400 can define the locations of such other data as offsets from the start of an image (given the start of the image as computed by the rule 402. Thus the format file 400 can include the location 404 of data indicating the length of an image, the location 406 of data indicating the stream or camera to which the image belongs, the location 408 of data indicating a time stamp for an image, and the location 410 of data indicating a type of the image. A rule 412 can be specified indicating how to search for any next image in a bitstream starting from the end of the current image in the bitstream, such as a reserved code to identify, and offset or other function.

Figure 5:
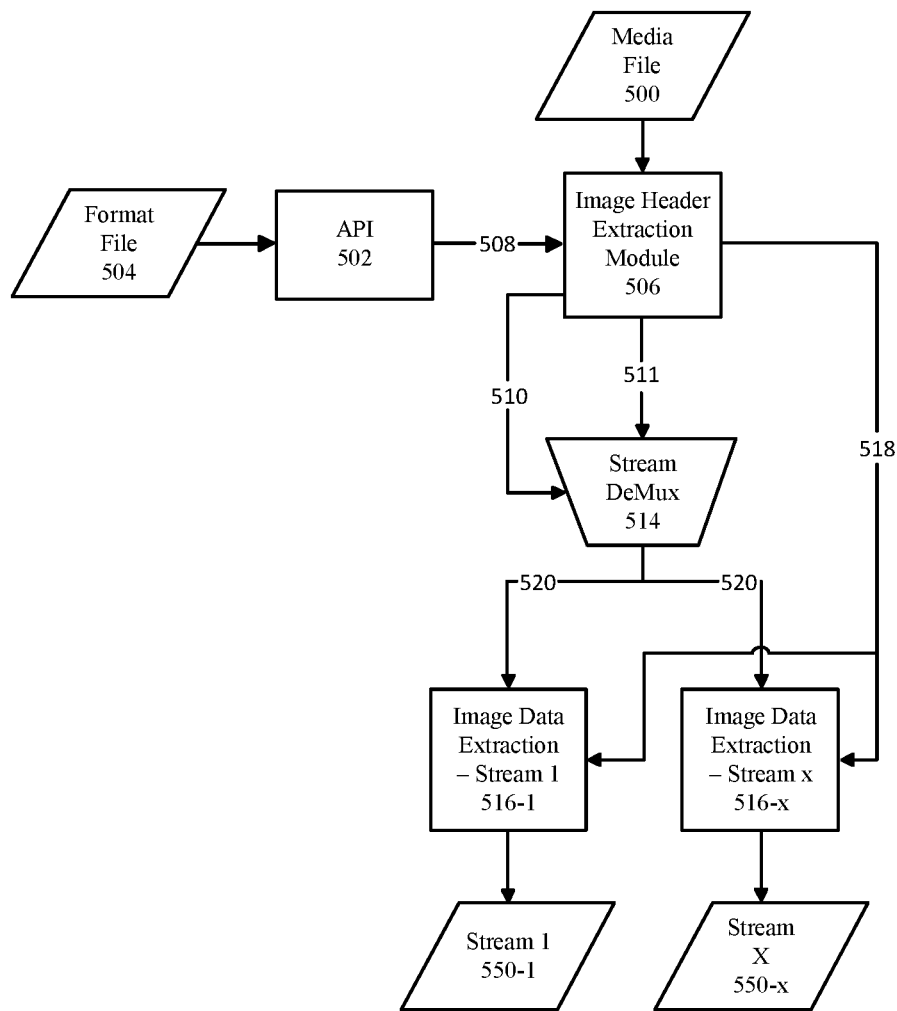
FIG. 5 is a data flow diagram of an illustrative example of an implementation of a decoder.

FIG. 5 is a data flow diagram of an illustrative example of an implementation of a decoder. A decoder has a first input that receives a media file 500, and a second input that receives, through an application programming interface (API) 502, format data such as from a format file 504. Typically, data from the media file 500 and format data, e.g., format file 504, are stored in memory and then accessed from the memory by the decoder. Data from the format file 504 is used to set various parameters of the decoder.

A file header extraction module 506 uses parameters 508 received through the API which locate images in the media file 500 and read image headers for those images from the media file. A stream demultiplexer 514 receives metadata 510 indicating the number and location of streams of media data in the media file and a bitstream 511 from the media file. The stream demultiplexer 514 demultiplexes the streams and provides the demultiplexed streams to image data extraction modules 516-1 to 516-x. The image data extraction modules receive their respective streams 520 of image data, and receive image processing parameters 518 as extracted from the file headers by the file header extraction module based on the format data, to generate decoded video streams 550-1 to 550-x. Time code information can be overlaid onto the decoded images based on time stamp information extracted from the media file 500. These streams 550-1 to 550-x can be stored in memory and decoded on the fly during playback of a selected stream, or can be processed into separate media files, or both.

It should be understood that the decoder as shown in FIG. 5 is merely illustrative. There are many ways in which a decoder can be implemented, including special purpose hardware as well as computer programs executed on general purpose hardware. An implementation may not include a stream demultiplexer 514; instead, for example, a decoder may simply read data for a selected stream using the format data to identify the data relevant for the selected stream. An implementation may include a single data extraction module that decodes an image of data otherwise identified and accessed based on the format data. An implementation of a decoder may include more or fewer components depending on the application and corresponding constraints.

In one implementation, a decoder can be implemented as a decoder on a network-accessible server computer, or collection of server computers, to which format files and media files can be sent, and from which processed media files can be received. The server computer(s) can store multiple format files and detect which format file is to be used to decode a given media file. For example, a format file can be labeled with an indication of a type of system for which it can be used to process media files originating from that type of system, and a media file, when provided to the server computer, can include or be associated with an indication of the type of system from which it originated. Format files can be uploaded to the server computer over time to expand the range of types of media files it can be used to process. Such a decoder also can be implemented as part of any analysis tool or image processing tool or video playback tool.

Figure 6A:
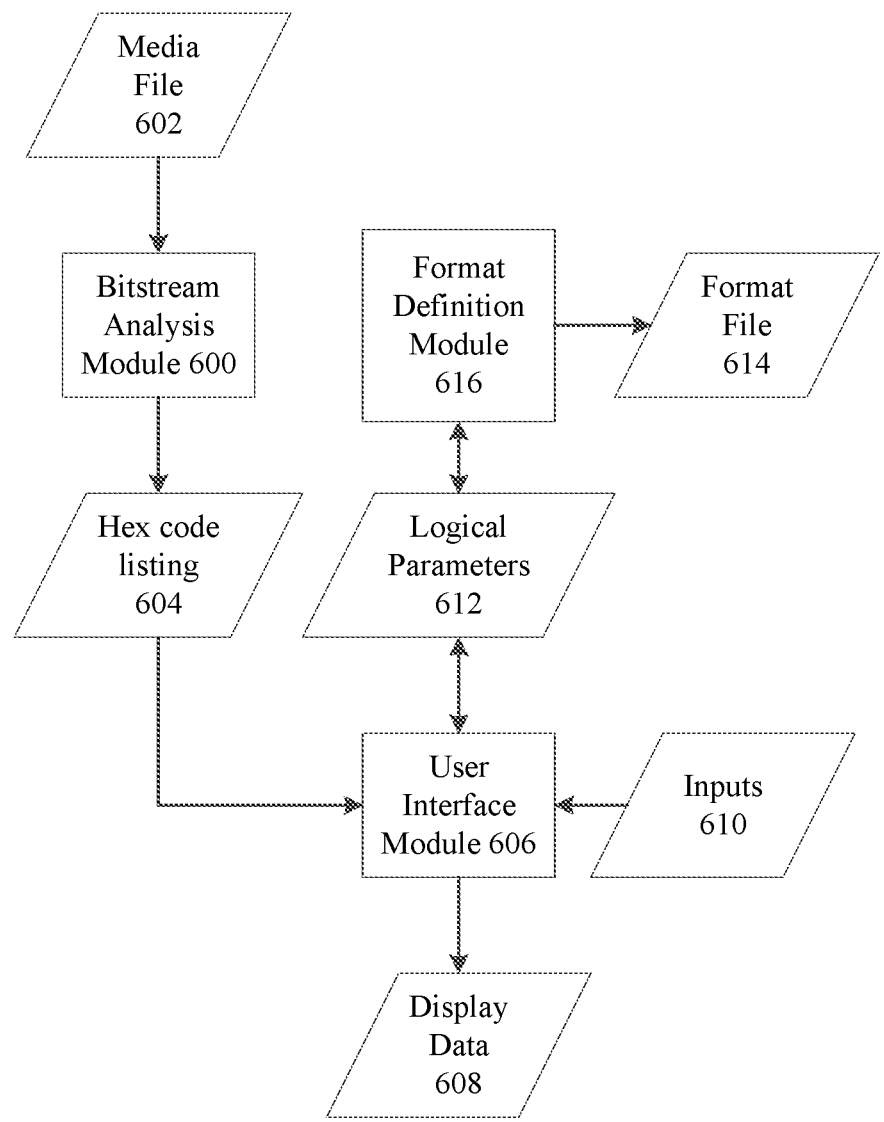
FIG. 6A is a data flow diagram of an illustrative example of an implementation of a file analysis module.

FIG. 6A is a data flow diagram of an illustrative example of an implementation of a format builder module, such as at 112 in FIG. 1. The format builder module includes a bitstream analysis module 600 that receives a media file 602 as an input. This bitstream analysis module generates a representation of the bitstream read from the media file 602. In this example implementation, the bitstream analysis module generates a hex code listing 604 of the bitstream. Using the representation of the bitstream, such as a hex code listing 604, the user interface module 606 generates display data 608 for presentation on a display to an end user. This display data provides a graphical representation of the bitstream.

The user interface module 606 also receives and provides information about the logical parameters 612 about the media file 602 which are to be stored as format data, such as in a format file 614, through a format definition module 616. The user interface module 606 accesses the logical parameters 612 which indicate the parameters that have been completed and the parameters that remain to be completed. The user interface generates, as part of the display data 608, a representation of these logical parameters to the end user in a human readable form that the end user can modify.

Using such a user interface module 606, the person viewing the hex code listing 604 can identify patterns in the displayed data, and in turn set "rules" in the logical parameters 612 which define which data is located at certain locations in the bitstream. The display of the hex code listing 604 can in turn be updated based on the logical parameters 612 as currently specified providing feedback to the person about the format of the bitstream.

For example, the hex code listing 604 may be initially displayed. Typically, an individual reviews the bitstream data for typical patterns generated by standard codecs. For example, the individual may see that each frame is separated by 16 bytes of "00", i.e., "00 00 00 00 00 00 00 00 00 00 00 00 00 00 00 00". Since such a sequence cannot be visual frame data, the individual can assume that such a sequence is padding between frames. In the subsequent bytes of data, the metadata for each frame typically can be identified. The individual then identifies a common pattern that exists before each frame starts. After that common pattern is identified, that pattern can be used to define the first logical parameter, or rule, that all others are built on. Such a rule may be data indicating "Frame start=[Hex code sequence]", where "[Hex Code Sequencer]" is replaced in a specific instance by the identified common pattern.

After initially defining where a frame may start, the hex code listing 604 may be displayed as a spreadsheet with a row for each image. The rows initially may be determined based on one or more patterns identified in the bitstream which identify frames, set by the first rule. In a spreadsheet format of presentation of the hex code listing 604, after each row is generated based on a pattern that identifies a frame, each column then should include the same respective data for each frame in the bitstream. For example, one column should include the data that defines the start of the frame, another column should indicate the length of the frame, another column should indicate the stream to which the frame belongs, another column should indicate the type of the frame, another column should indicate a time stamp. Different patterns in the data may be an indication of the type of data in any particular column. For example, a gradually incrementing value is likely indicative of the time code for each frame. A value that has a limited range, such as 0 to 7, or 0 to 16, is likely an indicator of a stream or camera. By determining what data is presented in other columns, the offsets of such data from the beginning of the frame can be determined, allowing further rules to be defined. In the user interface, some feedback can be provided to a user by highlighting columns in the spreadsheet which correspond to columns specified in or by defined rules.

Examples of additional rules that can be defined include, but are not limited to the following. The start of a frame of video can be defined as a numerical offset from the location (in bytes in the bitstream) of the start of a frame. The length of the frame typically is a value read from a location at a known offset from the start of a frame. The end of a frame of video can be defined as a sum of the location of the start of the frame and the length of the frame. A location from which to begin searching for a subsequent frame after a current frame can be defined by the location of the end of the current frame. Other values for a frame, such as the indicator of a channel, stream or camera, any date or time information, and the like, also typically is a value read from a location at a known offset from the start of the frame. In some cases, the type of the frame, such as whether the frame includes image data and the type of that image data (e.g. an image may be encoded as an I, P, or B frame, or may have other type information), or whether the frame includes audio data or other meta data, can be defined by another value read from a location at a known offset from the start of the frame. The type of a frame can be conditionally defined by a rule that specifies for a given type of the frame, the value that is present in the bitstream for that type of frame.

Rules can be specified using a variety of grammars, such as provided by a simple programming language. Typically, simple arithmetic and set operators (addition, subtraction, intersection, union), string and number operators (e.g., string length, hex-to-decimal conversion), Boolean operators, if/then statements, and the like, can be used.

The user interface module 606 receives inputs 610 from one or more input devices responsive to a person using the system through which the person provides instructions and other inputs to the format builder module. Some inputs allow the person to manipulate display of the representation of the bitstream generated from the media file, such as to provide different views of a hex code listing 604. Some inputs allow the person to modify or set the logical parameters 612 to be stored as the format data. In response to the inputs 610, the user interface module may update the logical parameters 612, or the graphical representation of the bitstream, or both.

After entry of the logical parameters 612 has been completed by the person, the format definition module 616 stores the format data in computer storage, such as by generating a format file 614, to be used later by a decoder.

FIG. 6B illustrates an example implementation for display data 608 provided by the user interface module 606. In this example, different rules are illustrated in a top section 650 (illustrated as one table in two parts in FIG. 6B). Another view 652 can be provided to illustrate data about each frame as derived based on the specified rules.

Figure 7:
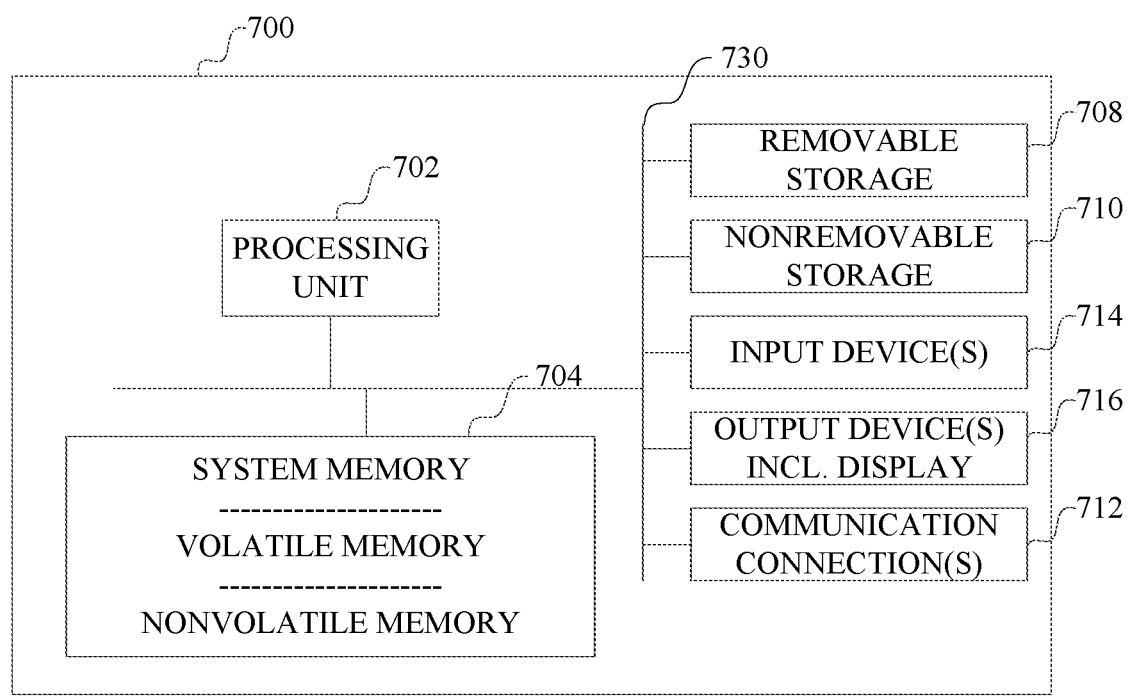
FIG. 7 is a block diagram of an example computer.

Having now described an example implementation, FIG. 7 illustrates an example of a computer with which components of the computer system of the foregoing description can be implemented. This is only one example of a computer and is not intended to suggest any limitation as to the scope of use or functionality of such a computer. The various modules, process steps, data structures, and graphical user interfaces in FIGS. 1 through 6 can be implemented in one or more computer programs executed on one or more such computers as shown in FIG. 7.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 7, a computer 700 includes a processing system comprising at least one processing unit 702 and at least one memory 704. The processing unit 702 can include multiple processing devices; the memory 704 can include multiple memory devices. A processing unit 702 comprises a processor which is logic circuitry which responds to and processes instructions to provide the functions of the computer. A processing device can include one or more processing cores (not shown) that are multiple processors within the same logic circuitry that can operate independently of each other. Generally, one of the processing units in the computer is designated as a primary processor, typically called the central processing unit (CPU). A computer can include coprocessors that perform specialized functions such as a graphical processing unit (GPU).

The memory 704 may include volatile computer storage devices (such as a dynamic or static random-access memory device), and non-volatile computer storage devices (such as a read-only memory or flash memory) or some combination of the two. A nonvolatile computer storage device is a computer storage device whose contents are not lost when power is removed. Other computer storage devices, such as dedicated memory or registers, also can be present in the one or more processors. The computer 700 can include additional computer storage devices (whether removable or non-removable) such as, but not limited to, magnetically-recorded or optically-recorded disks or tape. Such additional computer storage devices are illustrated in FIG. 7 by removable storage device 708 and non-removable storage device 710. Such computer storage devices 708 and 710 typically are nonvolatile storage devices. The various components in FIG. 7 are generally interconnected by an interconnection mechanism, such as one or more buses 730.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 704, removable storage 708 and non-removable storage 710 are all examples of computer storage devices. Computer storage devices and communication media are distinct categories, and both are distinct from signals propagating over communication media.

Computer 700 may also include communications connection(s) 712 that allow the computer to communicate with other devices over a communication medium. Communication media typically transmit computer program instructions, data structures, program modules or other data over a wired or wireless substance by propagating a signal over the substance. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 712 are devices, such as a wired network interface, or wireless network interface, which interface with communication media to transmit data over and receive data from signal propagated over the communication media.

The computer 700 may have various input device(s) 714 such as a pointer device, keyboard, touch-based input device, pen, camera, microphone, sensors, such as accelerometers, thermometers, light sensors and the like, and so on. The computer 700 may have various output device(s) 716 such as a display, speakers, and so on. Such devices are well known in the art and need not be discussed at length here.

The various computer storage devices 708 and 710, communication connections 712, output devices 716 and input devices 714 can be integrated within a housing with the rest of the computer, or can be connected through various input/output interface devices on the computer, in which case the reference numbers 708, 710, 712, 714 and 716 can indicate either the interface for connection to a device or the device itself as the case may be. The various modules, tools, or applications, and data structures and flowcharts of FIGS. 1-6, as well as any operating system, file system and applications on a computer in FIG. 7, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

In one aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system, comprising:
a processing system comprising computer storage and a processing device that executes computer program instructions, the computer storage storing computer program instructions implementing a decoder having a first input to receive an input media file and a second input to receive format data for the input media file, wherein the input media file comprises a bitstream including encoded data representing a plurality of multiplexed video streams originating from a plurality of cameras, wherein the format data comprises values for parameters in the bitstream for decoding the encoded data, locations of data in the bitstream for decoding the encoded data, and locations of encoded data for each video stream in the bitstream, and wherein the decoder includes programmable components having parameters specifying how the programmable components locate data in the bitstream used to decode the encoded data in the input media file, wherein the computer program instructions, when executed by the processing system, configure the processing system to:
set the parameters of the programmable components using the values and the locations specified by the format data; and
decode the encoded data of the multiplexed video streams in the input media file with the decoder configured with the parameters of the programmable components as set using the format data, to generate a respective, separate, time-stamped decoded video stream for each of the multiplexed video streams in the input media file;
wherein the format data includes at least:
data specifying a pattern indicative of a start of a frame of media data; and
data specifying a location of an identifier of a stream to which the frame of media data belongs with reference to the start of the frame of media data.

2. The computer system of claim 1, wherein the format data includes at least:
data specifying a location of beginning of image data for the frame with reference to the start of the frame of media data.

3. The computer system of claim 2, wherein the format data includes at least:
data specifying a location of data indicating a length of the image data for the frame with reference to the start of the frame of media data.

4. The computer system of claim 1, wherein the format data includes at least:
data specifying a location of data indicating a type of the frame with reference to the start of the frame of media data.

5. The computer system of claim 1, wherein the respective, separate, time-stamped decoded video streams comprise separate data files for separate streams of video data in the input media file.

6. The computer system of claim 1, wherein the respective, separate, time-stamped decoded video streams comprise separate data streams in memory for separate streams of video data in the input media file.

7. The computer system of claim 1, wherein the computer program instructions, when executed by the processing system, further configure the processing system to:
receive the format data through an application programming interface.

8. The computer system of claim 1, wherein the computer program instructions, when executed by the processing system, further configure the processing system to:
access the format data from a format file stored in the computer storage by another computing system.

9. The computer system of claim 1, wherein the computer program instructions, when executed by the processing system, configure the processing system to:
store multiple format files; and
detect a format file of the multiple format files to be used to decode the input media file, wherein the format file includes the format data.

10. The computer system of claim 9, wherein:
the format file is labeled with an indication of a type of system for which the format file is usable to process media files originating from the type of system; and
the input media file, when provided to the computer system, includes the indication of the type of system.

11. The computer system of claim 1, wherein the format data is generated based on a media file different from the input media file, and wherein the media file has a same file type as the input media file.

12. A computer system comprising:
a processing system comprising computer storage and a processing device that executes computer program instructions, the computer storage storing computer program instructions implementing a file analysis module having an input to receive an input media file, wherein the input media file comprises a bitstream including encoded data representing a plurality of multiplexed video streams in a bitstream of a proprietary structure, the file analysis module further having an output to provide format data describing the proprietary structure of the bitstream, wherein the format data comprises values for parameters in the bitstream for decoding the encoded data, locations of data in the bitstream for decoding the encoded data, and locations of encoded data for each video stream in the bitstream,
wherein the file analysis module, when executed by the processing system, configures the processing system to:
present, on a display, a graphical representation of the encoded data from the bitstream in the input media file using logical parameters defining the format data;
in response to inputs from a user, modify the logical parameters defining the format data describing the proprietary structure of the bitstream; and
using the logical parameters, generate and store the format data for the input media file, wherein the stored format data programs a programmable decoder to decode the input media file.

13. The computer system of claim 12, wherein the format data includes at least:
data specifying a pattern indicative of a start of a frame of media data; and
data specifying a location of an identifier of a stream to which the frame of media data belongs with reference to the start of the frame of media data.

14. The computer system of claim 13, wherein the format data includes at least:
data specifying a location of beginning of image data for the frame with reference to the start of the frame of media data.

15. The computer system of claim 14, wherein the format data includes at least:
data specifying a location of data indicating a length of the media data for the frame with reference to the start of the frame of media data.

16. The computer system of claim 12, wherein the format data includes at least:
data specifying a location of data indicating a type of a frame of media data with reference to a start of the frame of media data.

17. The computer system of claim 12, wherein the file analysis module, when executed by the processing system, further configures the processing system to:
using the modified logical parameters, update the graphical representation of the encoded data from the bitstream; and
present the updated graphical representation on the display.

18. The computer system of claim 12, wherein the format data includes at least:
data specifying a location of a time stamp for an image in the bitstream.

19. The computer system of claim 12, wherein the format data includes at least:
data specifying a camera to which an image in the bitstream belongs.

* * * * *